United States Patent
Seki et al.

(10) Patent No.: US 10,613,427 B2
(45) Date of Patent: Apr. 7, 2020

(54) SUSPENSION TYPE SCREEN DEVICE

(71) Applicant: IZUMI-COSMO COMPANY, LIMITED, Osaka (JP)

(72) Inventors: Kazuharu Seki, Tokyo (JP); Shuhei Kameda, Tokyo (JP); Teruyuki Abe, Tokyo (JP)

(73) Assignee: IZUMI-COSMO COMPANY, LIMITED, Osaka (JP)

( * ) Notice: Subject to any disclaimer, the term of this patent is extended or adjusted under 35 U.S.C. 154(b) by 0 days.

(21) Appl. No.: 16/272,521

(22) Filed: Feb. 11, 2019

(65) Prior Publication Data

US 2019/0250496 A1 Aug. 15, 2019

(30) Foreign Application Priority Data

Feb. 14, 2018 (JP) .................. 2018-024266

(51) Int. Cl.
| | |
|---|---|
| *G03B 21/58* | (2014.01) |
| *H04M 1/02* | (2006.01) |
| *G03B 21/60* | (2014.01) |
| *G03B 21/56* | (2006.01) |
| *G06F 1/16* | (2006.01) |

(52) U.S. Cl.
CPC .............. *G03B 21/58* (2013.01); *G03B 21/56* (2013.01); *G03B 21/60* (2013.01); *G06F 1/1601* (2013.01); *H04M 1/0268* (2013.01)

(58) Field of Classification Search
CPC ........ G03B 21/58; G03B 21/56; G03B 21/60; G06F 1/1601; H04M 1/0268
USPC ......................................................... 359/461
See application file for complete search history.

(56) References Cited

U.S. PATENT DOCUMENTS

| | | | |
|---|---|---|---|
| 2002/0048083 A1* | 4/2002 | Okumura ................. | E06B 9/42 359/461 |
| 2016/0266481 A1* | 9/2016 | Abe ......................... | G09F 7/04 |

FOREIGN PATENT DOCUMENTS

| | | | | |
|---|---|---|---|---|
| JP | 2004333603 | * | 5/2003 | ............ G03B 21/60 |
| JP | 2004-333603 A | | 11/2004 | |

* cited by examiner

*Primary Examiner* — Clayton E. LaBalle
*Assistant Examiner* — Kevin C Butler
(74) *Attorney, Agent, or Firm* — Renner, Otto, Boisselle & Sklar, LLP

(57) ABSTRACT

The present invention relates to a suspension type-screen device. The suspension type-screen device of the present invention includes a main roll rotatably supported on a casing; and a screen configured to be pulled back onto the main roll upon a storing thereof and to be pulled out downwardly from the main roll upon an use thereof. In particular, the suspension type-screen device of the present invention further includes a sub roll, and the sub roll is configured to be capable of supporting the screen located at a portion where a pull-out from the main roll is started.

7 Claims, 10 Drawing Sheets

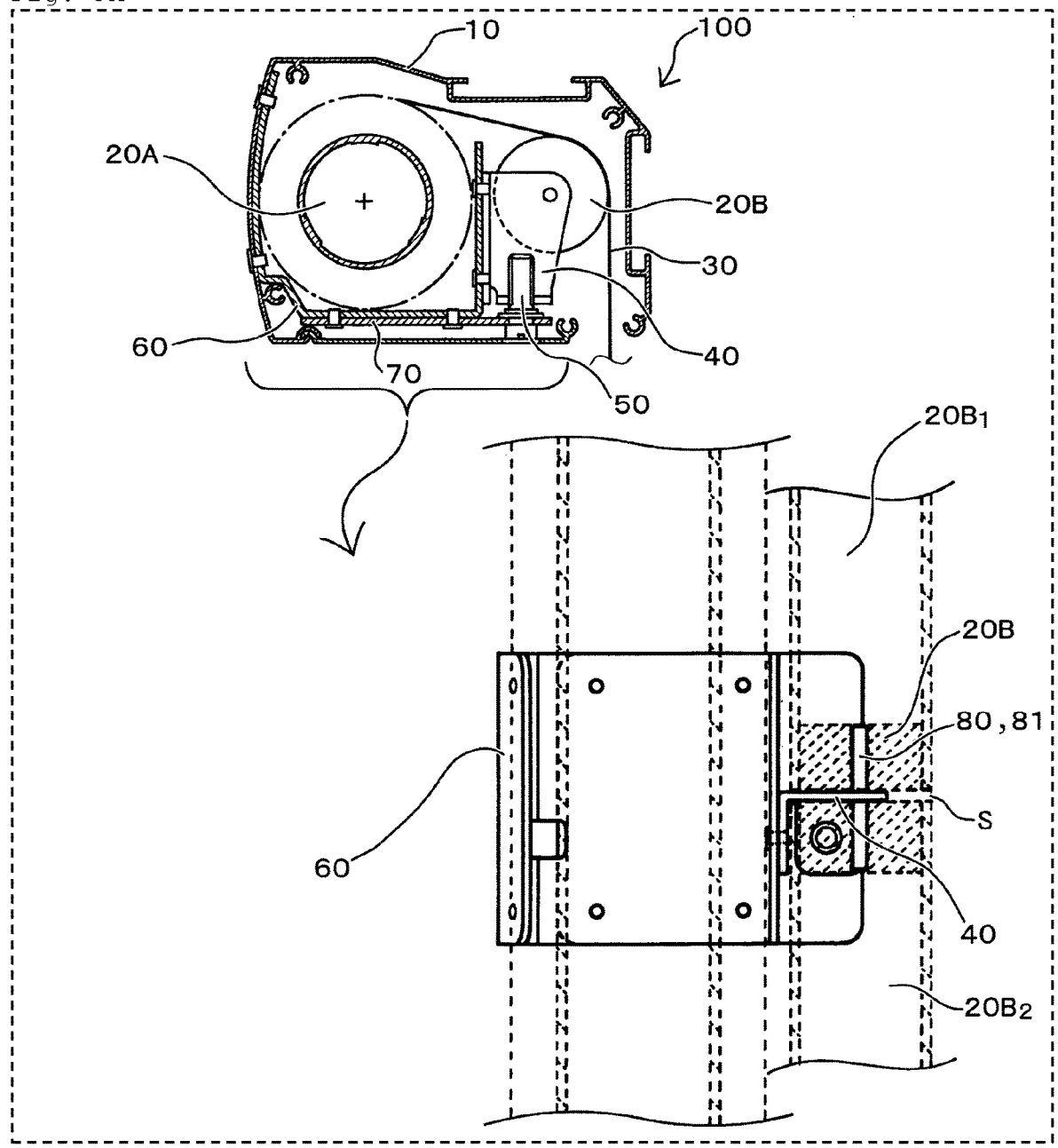

SUSPENSION TYPE SCREEN DEVICE

TECHNICAL FIELD

The present invention relates to a suspension type-screen device. In particular, the present invention relates to a suspension type-screen device including a large size screen.

BACKGROUND ART

A suspension type-screen device has been already used. The suspension type-screen device may be normally used in conjunction with a projector. Specifically, a screen as a composition element of the suspension type-screen device is pulled out downwardly, and then an image from the projector is projected on the screen.

PRIOR ART DOCUMENTS

Patent Documents

Patent Document 1: JP2004-333603A1

DISCLOSURE OF THE INVENTION

Problems to be Solved by the Invention

The inventors of the present application have found that the following problems may occur upon an use of a suspension type-screen device including a large size screen (for example, a 120 inch-screen) (see FIGS. 7 and 8).

Specifically, due to a relatively large width and length in a pull-out direction of a large size screen 30' wound around the roll 20', a large load of the screen 30' in a gravity direction is easily applied to the roll 20'. Thus, as shown in FIG. 8, the roll 20' itself rotatably supported on the casing 10' may be downwardly curved or bent to form a bow shape. In particular, the inventors of the present application have found that a downward curve in a shape of a bow of the roll 20' may easily occur in a case that the roll 20' has a relatively larger longitudinal dimension (e.g., 1500 mm to 3000 mm) of the roll 20' whereas the roll 20' has a relatively smaller lateral dimension (e.g., 45 mm to 55 mm) of the roll 20' (see FIG. 8). It is assumed that in a case where the longitudinal dimension of the roll 20' is large whereas the lateral dimension of the roll 20' is small, a strength of an entire roll 20' is lower than that of the roll 20' having a larger lateral dimension (e.g., 100 mm to 150 mm).

Under this situation, when the large size screen 30' is pulled out, the large size screen 30' wound around the roll 20' is also downwardly curved to form the bow shape due to the downward curve in the shape of the bow of the roll 20' itself. Thus, the present inventors of the present application found that, in a case that the pull-out of the large size screen 30' having the downward curve in the shape of the bow is started and then is finally completed, a v-shaped wrinkle 31' may occur in the large size screen 30' after a completion of the pull-out, especially at an upper side portion thereof. It is assumed that an occurrence of the v-shaped wrinkle 31' at the upper side portion of the large size screen 30' is due to a state that the upper side portion of the large size screen 30' is the latest pull out portion in time from the roll 20', and thus the upper side portion is the latest wound portion in time around the roll 20' curved downwardly. When an image 32' is projected on the v-shaped wrinkle 31' occurrence portion, the image projected on the v-shaped wrinkle 31' occurrence portion is more likely to have a distortion 33' compared to an image projected on a portion having no wrinkle (see FIG. 7). The distortion 33' may make it difficult to suitably see the image 32' as a whole.

Under these circumstances, the present invention has been created. That is, an object of the present invention is to provide a suspension type-screen device which is capable of suitably projecting an image from a projector onto a large size screen.

Means for Solving the Problems

In order to achieve the above object, an embodiment of the present invention provides a suspension type-screen device comprising:
a main roll rotatably supported on a casing; and
a screen configured to be pulled back around the main roll upon a storing thereof and to be pulled out downwardly from the main roll upon an use thereof, and
wherein the device further comprises a sub roll, and the sub roll is configured to be capable of supporting the screen located at a portion where a pull-out from the main roll is started.

In a preferred embodiment, the sub roll is located adjacent to the main roll as of a start of the pull-out of the screen.

In a preferred embodiment, the sub roll is rotatably supported on the casing and a longitudinal axis between both ends of the sub roll is configured to be capable of being curved upwardly.

In a preferred embodiment, the longitudinal axis between both ends of the upwardly curved sub roll is configured to be movable downwardly.

In a preferred embodiment, the suspension type-screen device further comprises an insertion part insertable from a lower side of the sub roll into an inside of the sub roll and a part to be pressed provided in the sub roll, and the insertion part is configured to be moved to be capable of pressing the part to be pressed in the sub roll.

In a preferred embodiment, at least two sub rolls have a single line arrangement to form a predetermined gap, each sub roll is coupled with each other via a coupling part, and the coupling part is used as the part to be pressed.

In a preferred embodiment, the suspension type-screen device further comprises an adjustment part serving to adjust a position of the insertion part, and a position of the adjustment part is configured to be changeable.

Effects of the Invention

In accordance with a suspension type-screen device of the present invention, it is possible to suitably project an image from a projector onto a large size screen.

BRIEF DESCRIPTION OF THE DRAWINGS

FIG. 3A is a schematic plan view of an insert part attached to an attachment part and insertable into a gap provided in a sub-roll.

MODES FOR CARRYING OUT THE INVENTION

A suspension type-screen device according to an embodiment of the present invention will be herein after described with reference to accompanying drawings.

Figure 7:
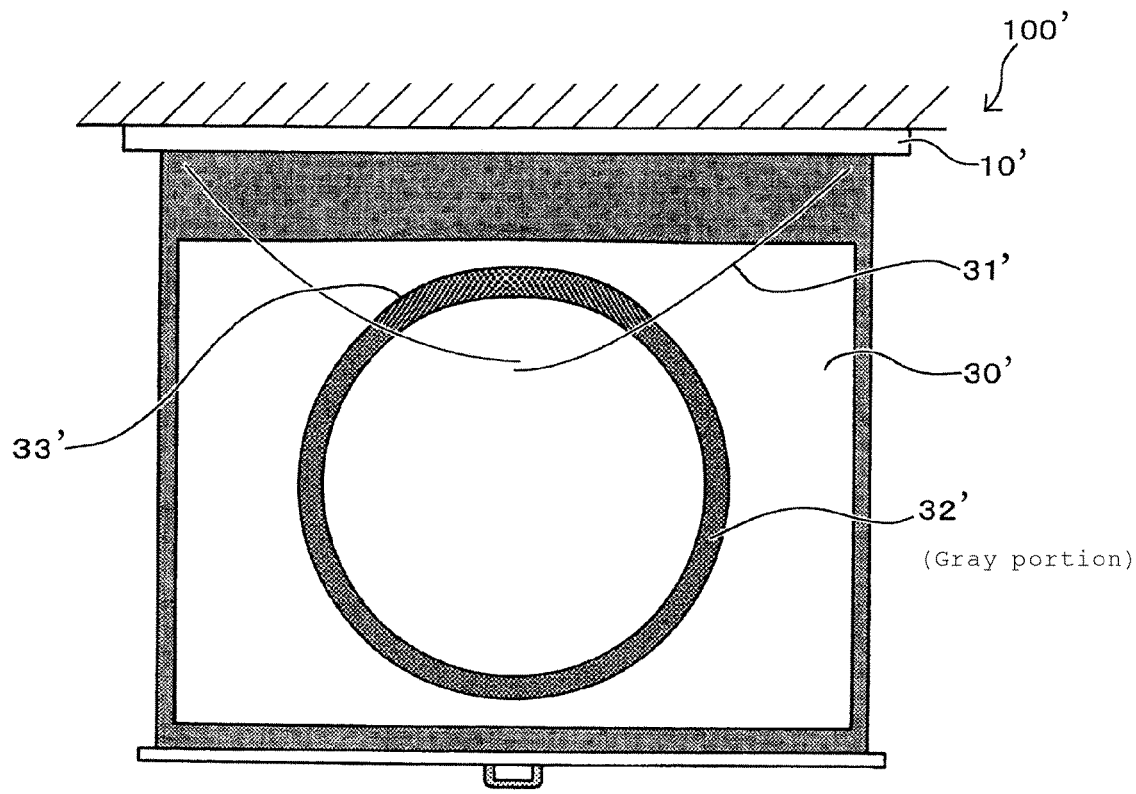
FIG. 7 is a schematic view of a large size screen having a v-shaped wrinkle in an extension state of the large size screen (i.e., a view showing a technical problem of the present application).
Figure 8:
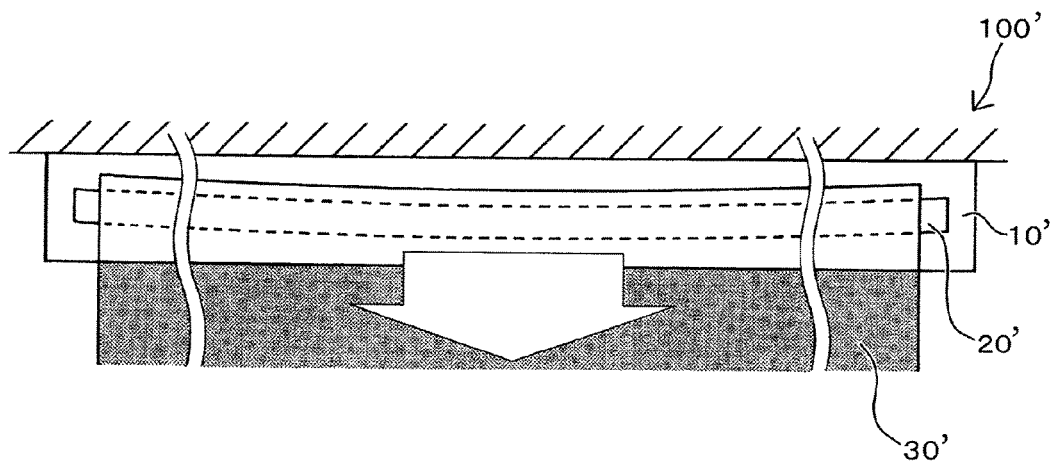
FIG. 8 is a schematic view of a downwardly curved roll (i.e., a view showing a technical problem of the present application).

As described above, the inventors of the present invention have found that the downward curve in the shape of the bow of the roll 20' may easily occur in the case that the roll 20' has the relatively larger longitudinal dimension (e.g., 1500 mm to 3000 mm) of the roll 20' whereas the roll 20' has the relatively smaller lateral dimension (e.g., 45 mm to 55 mm) of the roll 20' (see FIG. 8). The large size screen 30' wound around the roll 20' may be downwardly curved to form the bow shape due to the downward curve in the shape of the bow of the roll 20' itself. Thus, in the case that the pull-out of the large size screen 30' having the downward curve in the shape of the bow is started and then is finally completed, the v-shaped wrinkle 31' may occur in the large size screen 30' (see FIG. 7).

(Technical Idea of Present Invention)

As a result of an intensive study to solve the technical problem, the inventors of the present application have created such a technical idea that "another roll different from a roll for winding a large size screen is newly provided, and the new roll is used to support a screen at a portion where a pull-out from the roll for winding the large size screen is started".

The large size screen as of a start of the pull-out may be curved due to the downwardly curved roll. In this regard, according to the above technical idea, the screen at the start portion of the pull-out from the roll is supported. Thus, the support of the screen makes it possible to suitably avoid an "actual" downward curve of the large size screen as of the start of the pull out. This means that there is no technical significance even if a screen pulled out by a predetermined length from the roll is supported. This is because the screen pulled out by the predetermined length from the roll has an already completed curve due to the downwardly curved roll. In light of the above matters, there is a technical significance in that the screen at the start portion of the pull out is supported in view of an avoidance of the "actual" downward curve of the large size screen as of the start of the pull out thereof.

The technical idea of the present invention and technical effects based on the technical idea have been described above.

<Configuration of Suspension Type-screen Device>

An overall configuration of the suspension type-screen device according to an embodiment of the present invention will be described hereinafter based on the above technical idea.

Figure 1:
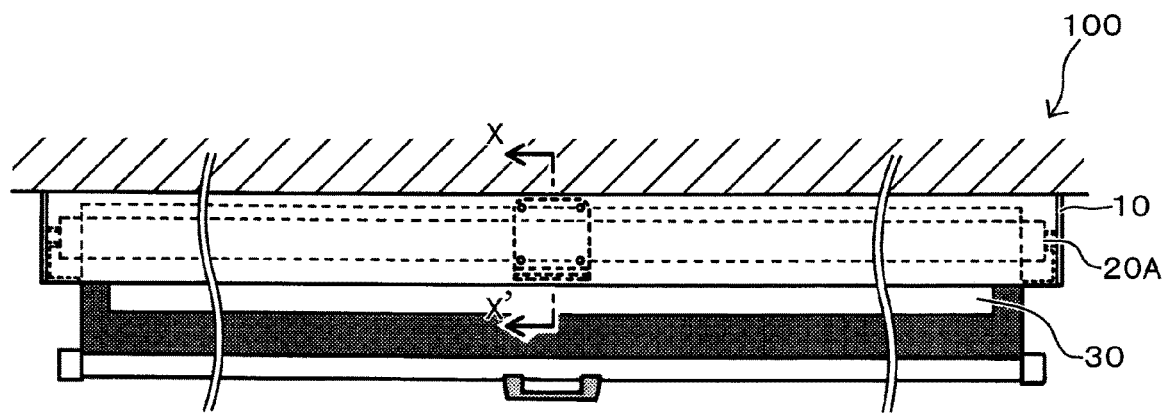
FIG. 1 is a schematic overall view of a suspension type-screen device according to an embodiment of the present invention.
Figure 2:
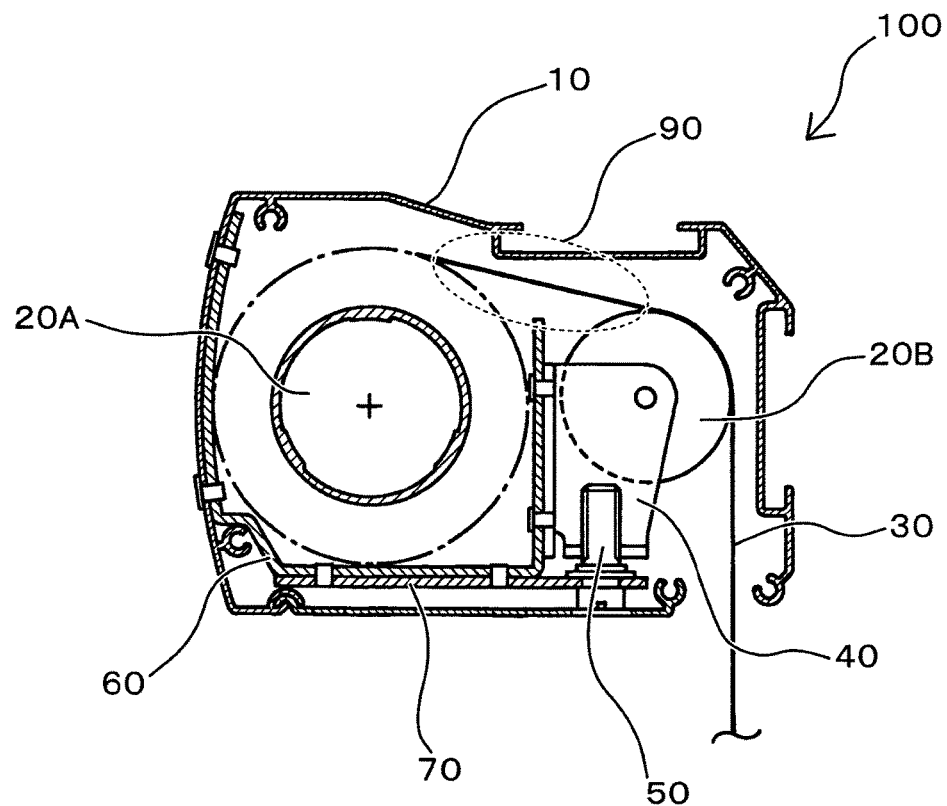
FIG. 2 is a schematic cross-sectional view of a suspension type-screen device according to an embodiment of the present invention along a line segment X-X' of FIG. 1.
Figure 3B:
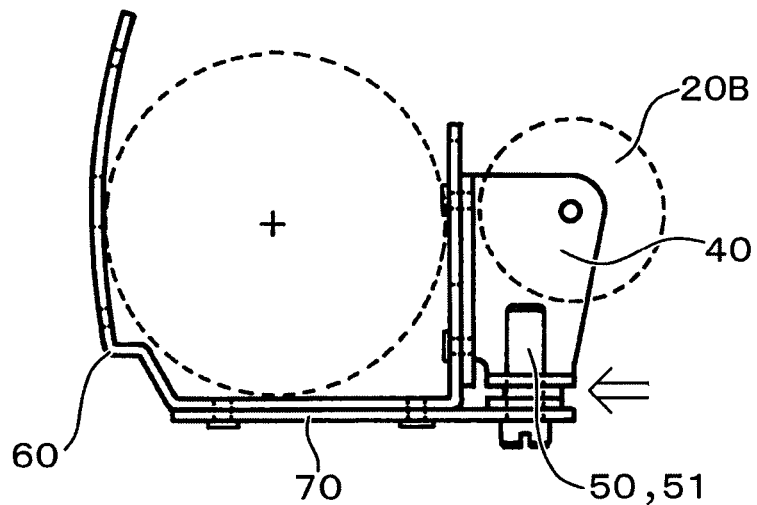
FIG. 3B is a schematic cross-sectional view of an insert part attached to an attachment part and insertable into a gap provided in a sub-roll.
Figure 3C:
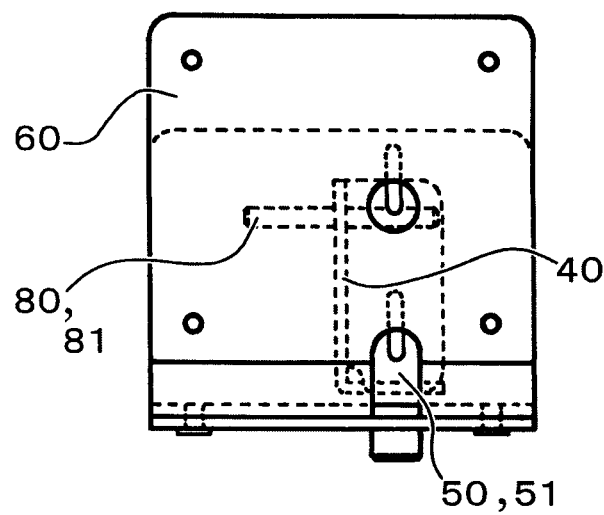
FIG. 3C is a schematic side view of an insert part attached to an attachment part and insertable into a gap provided in a sub-roll.
Figure 4A:
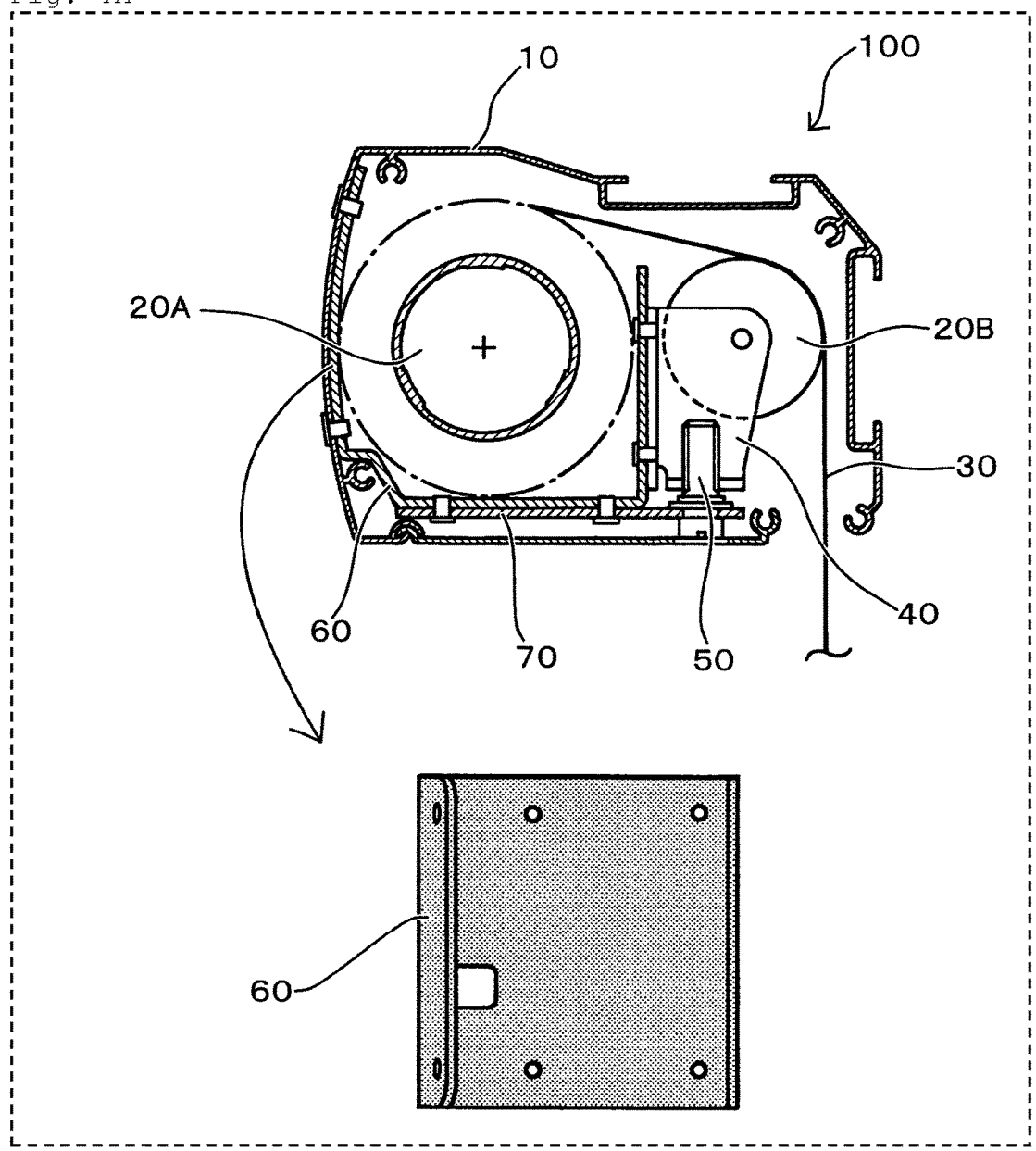
FIG. 4A is a schematic plan view of an attachment part.
Figure 4B:
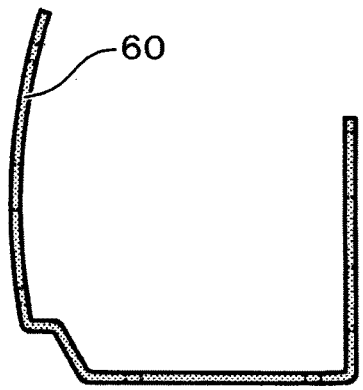
FIG. 4B is a schematic cross-sectional view of an attachment part.
Figure 4C:
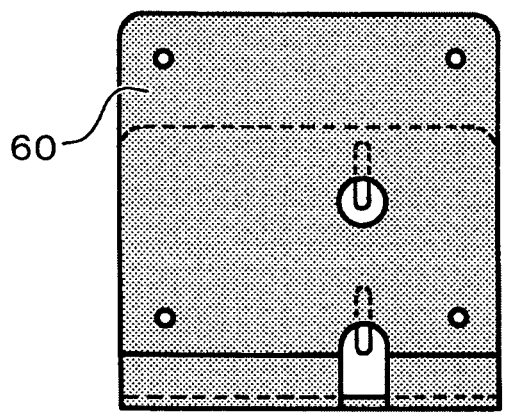
FIG. 4C is a schematic side view of an attachment part seen from one side.
Figure 4D:
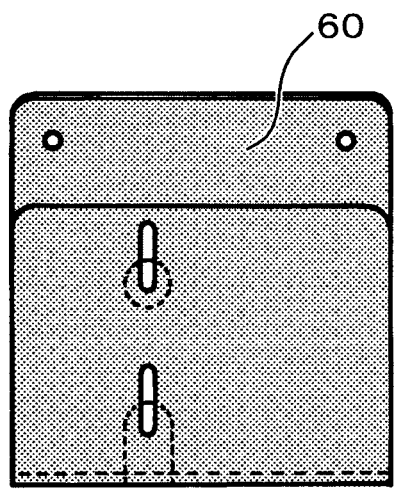
FIG. 4D is a schematic side view of an attachment part seen from other side.

FIG. 1 is a schematic overall view of a suspension type-screen device according to an embodiment of the present invention. FIG. 2 is a schematic cross-sectional view of a suspension type-screen device according to an embodiment of the present invention along a line segment X-X' of FIG. 1. FIG. 3A is a schematic plan view of an insert part attached to an attachment part and insertable into a gap provided in a sub-roll. FIG. 3B is a schematic cross-sectional view of an insert part attached to an attachment part and insertable into a gap provided in a sub-roll. FIG. 3C is a schematic side view of an insert part attached to an attachment part and insertable into a gap provided in a sub-roll. FIG. 4A is a schematic plan view of an attachment part. FIG. 4B is a schematic cross-sectional view of an attachment part. FIG. 4C is a schematic side view of an attachment part seen from one side. FIG. 4D is a schematic side view of an attachment part seen from other side.

Figure 5A:
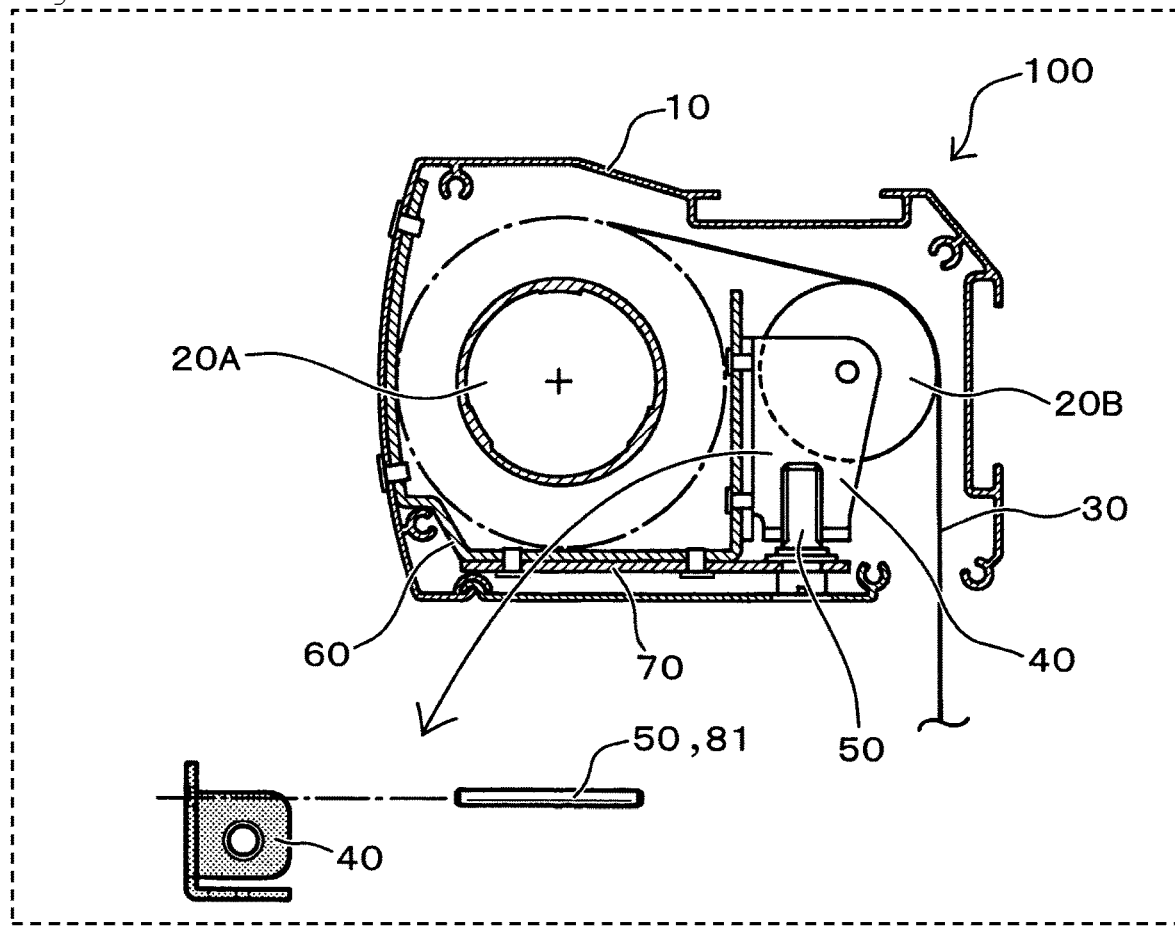
FIG. 5A is a schematic bottom view of an insertion part insertable into a gap provided in a sub roll.
Figure 5B:
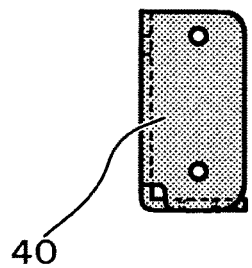
FIG. 5B is a schematic side view of an insertion part insertable into a gap provided in a sub roll.
Figure 5C:
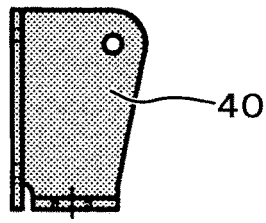
FIG. 5C is a schematic cross-sectional view of an insertion part insertable into a gap provided in a sub roll.
Figure 5D:
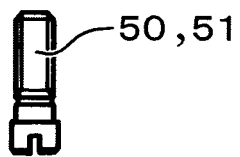
FIG. 5D is a schematic cross-sectional view of an adjustment part for a position adjustment of an insertion part.
Figure 5E:
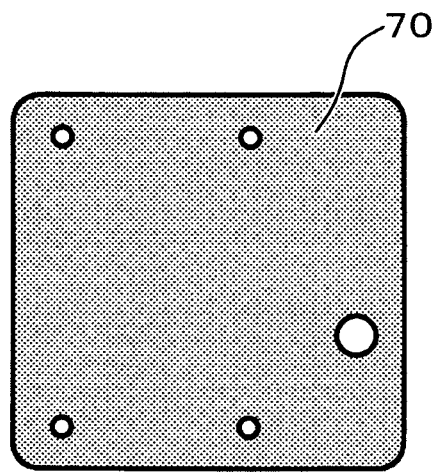
FIG. 5E is a schematic top plan view of a plate part attached to an attachment part to dispose an adjustment part.
Figure 5F:
FIG. 5F is a schematic side view of a plate part attached to an attachment part to dispose an adjustment part.
Figure 6A:
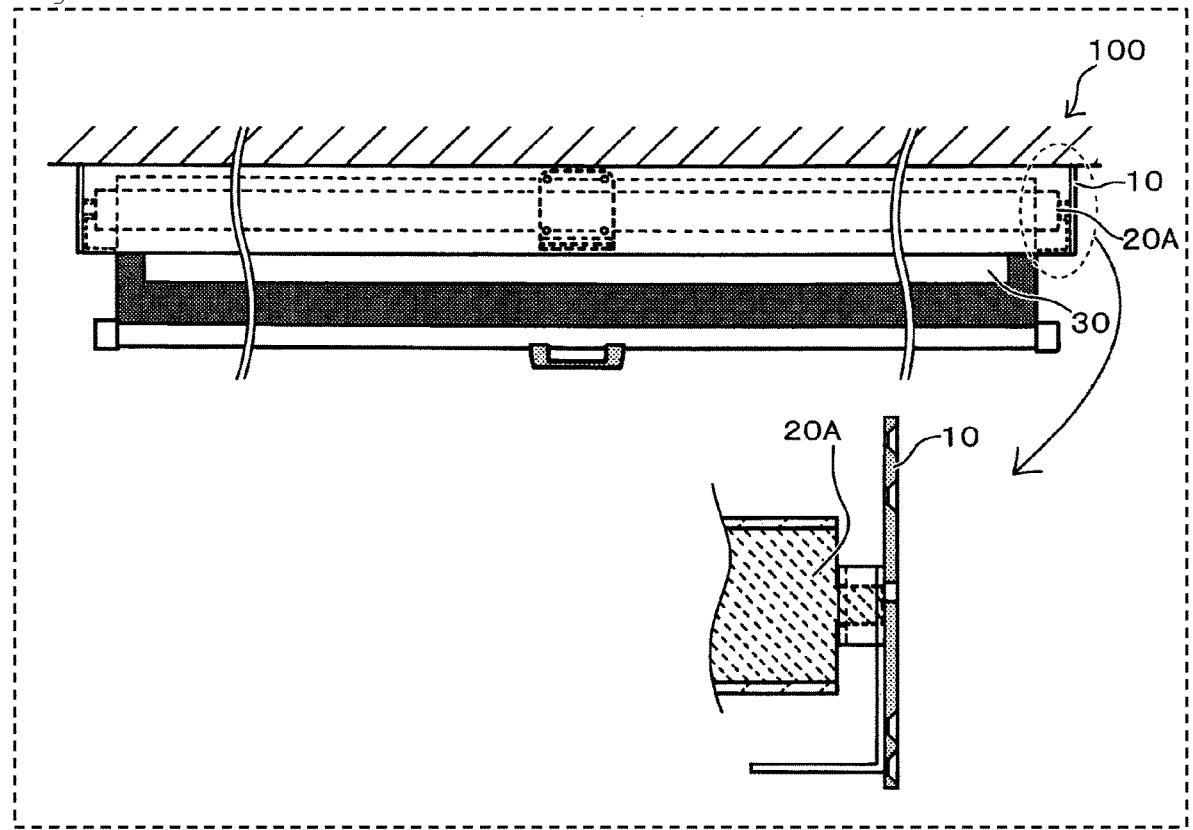
FIG. 6A is a schematic cross-sectional view of an arrangement relationship between an end portion of a roll and a casing.
Figure 6B:
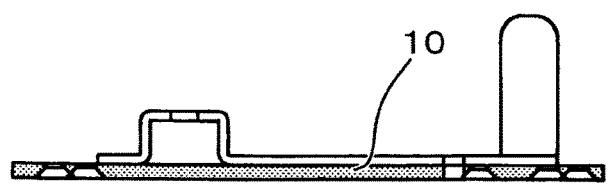
FIG. 6B is a schematic top plan view of a casing with which an end portion of a roll is connected.
Figure 6C:
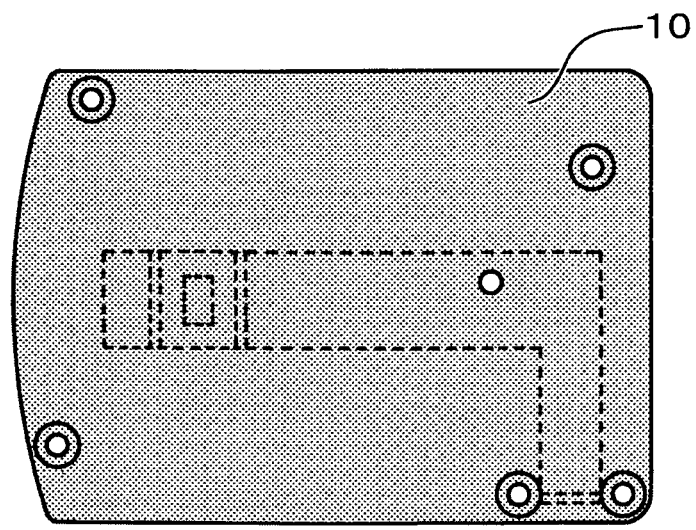
FIG. 6C is a schematic end view of a casing with which an end portion of a roll is connected.
Figure 6D:
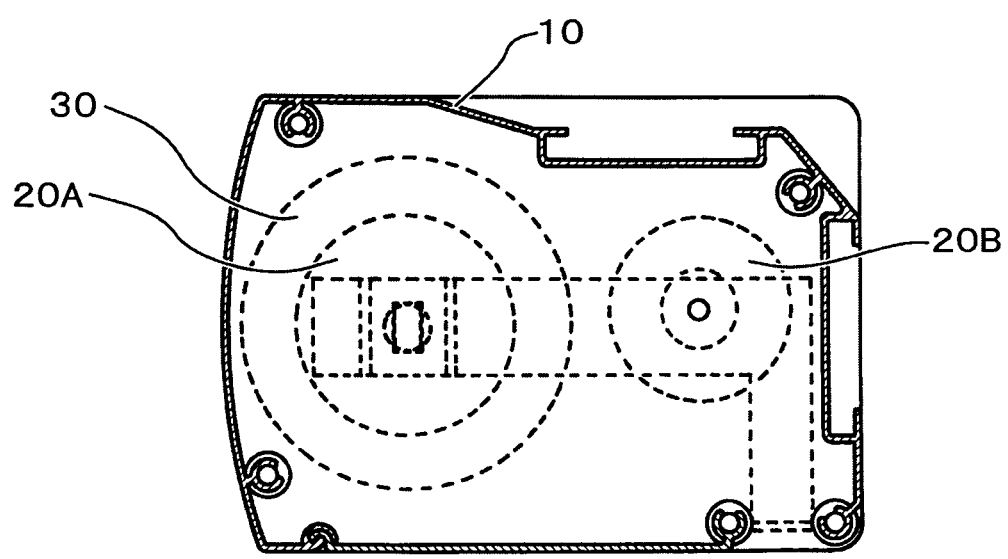
FIG. 6D is a schematic cross-sectional view of a casing with which an end portion of a roll is connected.

FIG. 5A is a schematic bottom view of an insertion part insertable into a gap provided in a sub roll. FIG. 5B is a schematic side view of an insertion part insertable into a gap provided in a sub roll. FIG. 5C is a schematic cross-sectional view of an insertion part insertable into a gap provided in a sub roll. FIG. 5D is a schematic cross-sectional view of an adjustment part for a position adjustment of an insertion part. FIG. 5E is a schematic top plan view of a plate part attached to an attachment part to dispose an adjustment part. FIG. 5F is a schematic side view of a plate part attached to an attachment part to dispose an adjustment part. FIG. 6A is a schematic cross-sectional view of an arrangement relationship between an end portion of a roll and a casing. FIG. 6B is a schematic top plan view of a casing with which an end portion of a roll is connected. FIG. 6C is a schematic end view of a casing with which an end portion of a roll is connected. FIG. 6D is a schematic cross-sectional view of a casing with which an end portion of a roll is connected.

A suspension type-screen device 100 according to an embodiment of the present invention at least includes a casing 10, a main roll 20A rotatably supported on the casing 10, a screen 30 which can be wound around the main roll 20A, an attachment part 60 attached to the casing 10 and also located at a center region of the main roll 20A, and a plate part 70 disposed on a bottom portion of the attachment part 60, the main roll 20A corresponding to a spring roll (see FIGS. 1 to 6D). Both ends of the main roll 20A are rotatably supported on the casing 10 (FIGS. 6A to 6C). The screen 30 is configured to be pulled back around the main roll 20A upon a storing of the screen 30 and also to be pulled out downwardly from the main roll 20A upon an use of the screen 30. A longitudinal dimension of the main roll 20A may be 1500 mm to 3000 mm, and a lateral dimension of the main roll 20A may be 45 mm to 55 mm. Namely, the roll for the winding in the present invention may be a roll which has a relatively smaller lateral dimension, in a comparison with the roll having the lateral dimension (for example, 100 mm to 150 mm) which is generally applied as described above. However, the present invention is not limited to an use of the roll for the winding having a relatively smaller lateral dimension. A roll for the winding having a relatively larger lateral dimension, and a roll for a motorized winding may be used if each of them serves as a main roll capable of winding a large size screen (e.g., a 120-inch screen).

In the present invention, the suspension type-screen device 100 further includes a sub roll 20B. Both ends of the sub roll 20B are rotatably supported on the casing 10 (see FIGS. 2, 3B and 6D). In particular, in the present invention, the sub roll 20B is configured to be capable of supporting a large size screen 30 at a portion 90 where a pull-out from the main roll 20A is started. This is a main technical feature of the present invention. The phrase "large size screen 30 at the portion 90 where the pull-out from the main roll 20A is started" as used herein may include (1) a screen 30 at a portion where the pull-out is started on a condition that the entire screen 30 is wound around the main roll 20A, and (2) a screen 30 at a portion where the pull-out is started on a condition that a part of the screen 30 is wound around the main roll 20A. According to such the technical feature, the sub roll 20B is disposed adjacent to the main roll 20A as of a start of the pull-out of the large size screen 30. Upon the start of pull-out of the large size screen, the main roll 20A is surrounded by the screen 30 having a predetermined thickness in a cross-sectional view.

In other words, the sub roll 20B is arranged adjacent to the screen 30 having a predetermined thickness surrounding the main roll 20A. The phrase "adjacent arrangement" as used herein means that the sub roll 20B and the large size screen 30 having a predetermined thickness and also surrounding the main roll 20A are in the closest arrangement relationship with each other. While being not particularly limited, a spaced distance between the sub roll 20B and the large size screen 30 may be 3 mm to 30 mm, 6 mm to 15 mm, preferably. The spaced distance is for example 10 mm. This numerical range makes it possible to locate the sub roll 20B relatively adjacent to the main roll 20A, and thus the sub roll 20B can suitably support the large size screen 30 at the start portion of the pull-out thereof. The above spaced distance is merely an example. For example, in a super large size screen having a dimension of more than 300 inches, the spaced distance may become larger in a condition that the screen 30 at the start portion of the pull-out 90 is "supported" by the sub roll 20B.

According to this configuration, the large size screen 30 at the start portion of the pull out 90 from the main roll 20A is supported. Upon a start of the pull-out of the screen 30, the sub roll 20B and the large size screen 30 having the predetermined thickness and also surrounding the main roll 20A are in the closest arrangement relationship with each other. Due to the closest arrangement, the large size screen 30 is supported by the sub roll 20B substantially simultaneously with the start of the pull-out, which can suitably avoid an "actual" downward curve of the large size screen 30 due to the main roll 20A which may be curved downwardly. The avoidance of the downward curve of the large size screen 30 at the start portion of the pull-out 90 makes it possible to suitably avoid an occurrence of a v-shaped wrinkle in the large size screen 30 upon an extension thereof resulting from a continuous pull-out of the large size screen. Namely, the present invention has a technical feature that the sub roll 20B does not simply serve as a guide roll, but it serves as a "part for avoiding the downward curve of the screen" at the start portion of the pull-out.

The phrase "support of the large size screen 30 at the portion where the pull out is started 90 by the sub roll 20B" as used herein means that the sub roll 20B is located directly below the large size screen 30 such that the large size screen 30 at the start portion of the pull out 90 contacts the sub roll 20B in a broad sense. In other words, the phrase "support of the large size screen 30 at the portion where the pull out is started 90 by the sub roll 20B" as used herein means that the large size screen 30 is located directly above the sub roll 20B such that the large size screen 30 at the start portion of the pull out 90 contacts the sub roll 20B in a broad sense. The phrase "support of the large size screen 30 at the portion where the pull out is started 90 by the sub roll 20B" as used herein means "a continuous support, not an intermittent support" in a narrow sense. According to the technical definition, the sub roll 20B can more suitably support a latest wound portion in time around the main roll 20A which may be curved downwardly (i.e., a portion to be finally pulled out from the main roll 20A). In the present invention, the support of the sub roll 20B can suitably avoid an "actual" downward curve of a portion to be finally pulled out from the main roll 20A. Thus, it is possible to suitably avoid the occurrence of the v-shaped wrinkle in an upper side region of the large size screen 30, the upper side region of the large size screen 30 being a region where the v-shaped wrinkle is likely to occur. In this point, the present invention has a technical significance especially.

Hereinafter, a basic operation embodiment upon an use of the suspension type-screen device 100 including the sub roll 20B will be described.

(1) A pull-out of the screen 30 wound around the main roll 20A is started by an user.

(2) When the pull-out of the screen 30 is started, the screen 30 at the start portion of the pull-out 90 is spaced apart from the screen 30 wound around the main roll 20A.

(3) The sub roll 20B supports the large size screen 30 "at the portion where the pull out is started 90" spaced apart from the screen 30 wound around the main roll 20A. The support of the screen 30 "at the portion where the pull out is started 90" by the sub roll 20B makes it possible to avoid a downward curve of the screen 30 due to the main roll 20A which may be curved downwardly. The avoidance of the downward curve of the large size screen 30 at the start portion of the pull out 90 can suitably avoid an occurrence of a v-shaped wrinkle in the large size screen 30 upon an extension state thereof resulting from a continuous pull out.

It is preferable that the present invention adopts the following embodiment.

In an embodiment, it is preferable that the sub roll 20B is rotatably supported on the casing 10 and a longitudinal axis between both ends of the sub roll 20B is configured to be capable of being curved upwardly. It is preferable that the longitudinal axis between both ends of the upwardly curved sub roll 20B is configured to be movable downwardly. The term "upward" as used herein means a direction opposite to a direction in which the screen 30 is downwardly pulled out for an extension thereof, the screen 30 being a composition element of the suspension type-screen device 100. The term "downward" as used herein means a direction in which the screen 30 is downwardly pulled out for an extension thereof, the screen 30 being a composition element of the suspension type-screen device 100.

When the pull-out of the screen 30 from the main roll 20A is started, a position of the pull-out of the screen 30 may be as follows. Specifically, there is a difference between a position of the pull-out of the screen 30 as of a start of the pull-out based on a wound state of an entire screen 30 on the main roll 20A and that as of a start of the pull-out based on a wound state of a part of the screen 30 on the main roll 20A. Specifically, the position of the pull-out of the screen 30 as of the start of the pull-out based on the wound state of the entire screen 30 on the main roll 20A is higher than that as of the start of the pull-out based on the wound state of a part of the screen 30 on the main roll 20A, due to a winding of a predetermined thickness. On the other hand, the position of the pull-out of the screen 30 as of the start of the pull-out based on the wound state of a part of the screen 30 on the main roll 20A is lower than that as of the start of the pull-out based on the wound state of the entire screen 30 on the main roll 20A, due to a winding of a non-predetermined thickness. Despite a difference of the position of the pull-out, the above "continuous support" of the large size screen 30 at the start portion of the pull out by the sub roll 20B may be difficult if the sub roll 20B is maintained at the same position in a cross-sectional view.

In light of the above matters, in a case that the position of the pull out of the screen 30 has a relatively higher level, it is preferable that the longitudinal axis between both ends of the sub roll 20B rotatably supported on the casing 10 is configured to be capable of being curved upwardly. Thus, in the case that the position of the pull-out of the screen 30 has the relatively higher level, an upward movement of the sub roll 20B enables a gap to be suitably eliminated, the gap being a gap which may occur between "the sub roll 20B" and "the large size screen 30 at the portion where the pull-out is started 90 corresponding to the start portion of the pull-out 90)". More specifically, even if the "gap" may occur between "the sub roll 20B" and "the screen 30 at the portion where the pull-out is started based on the winding state of the entire screen or substantial entire screen 30 around the main roll 20A", the upward movement of the sub roll 20B enables the "gap" to be suitably eliminated. Thus, in the case that the position of the pull-out of the screen 30 has the relatively "higher level", the suitable elimination of the gap makes it possible to suitably keep the continuous support of the large size screen 30 at the portion where the pull out 90 is started from a state that the entire screen 30 or a substantial entire screen 30 is wound around the main roll 20A, the continuous support being performed by the sub roll 20B.

In contrast, in a case that the position of the pull out of the screen 30 has a relatively "lower level", it is preferable that the longitudinal axis between both ends of the upwardly curved sub roll 20B is configured to be movable downwardly. Specifically, it is preferable that the upwardly curved sub roll 20B is configured to be movable downwardly toward an initial position of the sub roll 20B prior to the upward curve thereof. Thus, in the case that the position of the pull-out of the screen 30 has the relatively "lower level", a downward movement of the upward curved sub roll 20B enables a "gap" to be suitably eliminated, the "gap" being a gap which may occur between "the sub roll 20B" and "the screen 30 at the portion where the pull-out is started based on a state that a part of the screen 30 is wound around the main roll 20A". More specifically, even if the "gap" may occur between "the sub roll 20B" and "the screen 30 at the portion where the pull-out is started based on the state that the part of the screen 30 is wound around the main roll 20A", due to the downward movement of the upward curved sub roll 20B toward the initial position of the sub roll 20B prior to the upward curve thereof, a suitable elimination of the "gap" is possible. Thus, in the case that the position of the pull-out of the screen 30 has the relatively "lower level", the suitable elimination of the gap makes it possible to suitably keep the continuous support of the large size screen 30 at the portion where the pull out 90 is started based on the state that the part of the screen 30 is wound around the main roll 20A, the continuous support being performed by the sub roll 20B.

As described above, both ends of the sub roll 20B may be normally rotatably supported on the casing 10. Thus, due to the rotatable support of the both ends onto the casing 10, a longitudinal axis between the both ends of the sub roll 20B can be curved upwardly. More specifically, the longitudinal axis of the sub roll 20B can be curved to form a bow shape upwardly in a cross-sectional view. Since the both ends of the sub roll 20B are rotatably supported onto the casing 10, a degree of the curve of the side region of the longitudinal axis of the sub roll 20B is relatively smaller than that prior to the curve, while a degree of the curve of the central region of the longitudinal axis of the sub roll 20B is relatively larger than that prior to the curve. Although being not particularly limited, the longitudinal axis of the sub roll 20B may be configured to be curved upwardly by 0.5 mm to 10 mm when both of a central region and a side region of the longitudinal axis of the sub roll 20B are seen entirely. The sub roll 20B may be made of a material which enables the sub roll 20B to be curved upwardly from an initial state that both ends are rotatably supported onto the casing such that the sub roll 20B can suitably support the screen 30 at the start portion of the pull out. Although being not particularly limited, the sub roll 20B may be made of an aluminum-based material, a stainless-based material, or an iron-based material in terms of a provision of curve characteristics. In particular, the aluminum-based material or the stainless-based material with a small Young's modulus value (i.e., with a high flexibility) may be used.

In a case that the large size screen is wound around the main roll 20A, the main roll is curved downwardly to form the bow shape since a large load of the large size screen is likely to be easily applied in a gravity direction, which leads to a downward curve in a shape of the bow of the wound screen. Thus, a degree of the downward curve of the center region of the screen is the largest. It is conceived that the center region of the screen having the largest degree of the downward curve has a bad influence on the occurrence of the v-shaped wrinkle. In contrast, according to an embodiment, since the longitudinal axis may be curved upwardly to form the bow shape in a cross-sectional view, a degree of the upward curve of the center region of the sub roll 20B is the largest. In light of the above matters, the center region of the sub roll 20B having the largest degree of the upward curve is located to the center region of the screen having the largest degree of the downward curve. Thus, the center region of the sub roll 20B having the largest degree of the upward curve and that of the screen having the largest degree of the downward curve can be in an offset relationship with each other. Therefore, the offset relationship makes it possible to suitably avoid the downward curve of the center region of the screen upon the pull-out of the screen.

According to an embodiment, it is preferable that the suspension type-screen device further includes an insertion part 40 insertable from a lower side of the sub roll 20B into an inside thereof and a part to be pressed 80 provided in the sub roll 20B, and the insertion part 40 is configured to be upwardly moved to be capable of pressing the part to be pressed 80 in the sub roll 20B.

As shown in FIG. 2, FIGS. 3A-3C and FIGS. 5A-5C, there is further provided the insertion part 40 insertable from the lower side of the sub roll 20B into the inside of the sub roll 20B. The insertion part 40 is configured to be upwardly moved. The part to be pressed 80 is provided in the sub roll 20B. The insertion part 40 is provided on an attachment part 60 which is disposed on the casing 10 and which is also located at a center region of the main roll 20A. Specifically, the attachment part 60 has an inverted L-shaped configuration in a cross-sectional view, and the insertion part 40 is located on an upward extension surface of the attachment part 60. Due to such the configuration, the insertion part 40 can contact the part to be pressed 80 by an insertion of the insertion part 40 into the sub roll 20B and a subsequent start of upward movement of the insertion part 40, which makes it possible to press the part to be pressed 80. The press of the part to be pressed 80 enables the sub roll 20B to be upwardly moved. Due to the upward movement of the sub roll 20B by the movement of the insertion part 40 to the part to be pressed 80 in the sub roll 20B to press the part 80, it is suitably eliminate a gap between "the sub roll 20B" and "the large size screen 30 at portion where the pull-out is started 90" even if the gap may occur as described above. The suitable elimination of the gap makes it possible to suitably keep the "continuous support" of the large size screen 30 at the portion where the pull out 90 is started, the continuous support being performed by the sub roll 20B.

According to an embodiment, it is preferable that at least two sub rolls 20B₁, 20B₂ have a single line arrangement to form a predetermined gap S, each sub roll 20B₁, 20B₂ is coupled with each other via a coupling part 81, and the coupling part 81 is used as the part to be pressed 80.

This embodiment relates to a specific means for the upward movement of the insertion part 40 from a lower side of the sub roll 20B to the inside thereof. Specifically, as shown in FIG. 3A and FIG. 3C, in a case that at least two sub rolls 20B₁, 20B₂ have a single line arrangement to form a predetermined gap S, it is possible for the insertion part 40 to make an upward movement from the lower side of the sub roll 20B to the inside thereof via the gap S. As shown in FIG. 3A, each sub roll 20B₁, 20B₂ is coupled with each other via the coupling part 81. According to such configurations, upon the upward movement of the insertion part 40 via the gap S in the sub roll 20B, the insertion part 40 can contact the coupling part 81 to thereby press the coupling part 81. This means that the coupling part 81 serves as the part to be pressed 80 as described above. A press of the coupling part 81 enables the sub roll 20B itself to be moved upwardly. Namely, the upward movement of the sub roll 20B is possible due to the movement of the insertion part 40 onto the coupling part 81 in the sub roll 20B for the press of the coupling part 81. Thus, the upward movement of the sub roll 20B enables a gap to be suitably eliminated even if the gap may occur, the gap being a gap being formed between "the sub roll 20B" and "the large size screen 30 at the portion where the pull-out is started".

According to an embodiment, it is preferable that the suspension type-screen device further includes an adjustment part 50 serving to adjust a position of the insertion part 40, and a position of the adjustment part 50 is configured to be changeable.

This embodiment relates to a specific means for adjusting the position of the insertion part 40. As shown in FIG. 2, FIGS. 3B-3C, and FIG. 5D, the adjustment part 50 whose position is changeable is disposed at a lower region of the insertion part 40 such that the adjustment part 50 connects the insertion part 40. The adjustment part 50 is secured at an end portion of a plate part 70 disposed on the bottom portion of the attachment part 60. Since the position of the adjustment part 50 is changeable, a change of the position of the adjustment part 50 enables the position of the insertion part 40 connected with the adjustment part 50 to be changed at the same time. Although being not particularly limited, a screw part 51 may be used as the adjustment part 50. By operating the screw part 51 from an outside by an operator, a position of the screw part 51 can be changed. Specifically, in a case that the screw part 51 is moved in an upwardly tighten direction of the screw part, it is possible to upwardly move the insertion part 40 connected with the screw part 51. Thus, the upward movement of the insertion part 40 makes it possible to press the part to be pressed 80 at a later time. Due to the press of the part to be pressed 80, an upward movement of the sub roll 20B itself is possible. Thus, even if the gap may occur between "the sub roll 20B" and "the large size screen 30 at the portion where the pull-out is started 90", the gap can be suitably eliminated.

Although the suspension type-screen device according to an embodiment of the present invention has been hereinbefore described, the present invention is not limited to matters described above. It will be readily appreciated by those skilled in the art that various modifications are possible without departing from the scope of the present invention.

It should be noted that the present invention as described above includes the following aspects:

The first aspect: A suspension type-screen device comprising:

a main roll rotatably supported on a casing; and a screen configured to be pulled back around the main roll upon a storing thereof and to be pulled out downwardly from the main roll upon an use thereof, and wherein the device further comprises a sub roll, and the sub roll is configured to be capable of supporting the screen located at a portion where a pull-out from the main roll is started.

The second aspect: The suspension type-screen device according to the first aspect, wherein the sub roll is located adjacent to the main roll as of a start of the pull-out of the screen.

The third aspect: The suspension type-screen device according to the first or second aspect, wherein the sub roll is rotatably supported on the casing and a longitudinal axis between both ends of the sub roll is configured to be capable of being curved upwardly.

The fourth aspect: The suspension type-screen device according to the third aspect, wherein the longitudinal axis between both ends of the upwardly curved sub roll is configured to be movable downwardly.

The fifth aspect: The suspension type-screen device according to any one of the first to fourth aspects, further comprising an insertion part insertable from a lower side of the sub roll into an inside thereof and a part to be pressed provided in the sub roll, and wherein the insertion part is configured to be upwardly moved to be capable of pressing the part to be pressed in the sub roll.

The sixth aspect: The suspension type-screen device according to the fifth aspect, wherein at least two sub rolls have a single line arrangement to form a predetermined gap, each sub roll is coupled with each other via a coupling part, and the coupling part is used as the part to be pressed.

The seventh aspect: The suspension type-screen device according to the fifth or sixth aspect, further comprising an adjustment part serving to adjust a position of the insertion part, and wherein a position of the adjustment part is configured to be changeable.

INDUSTRIAL APPLICABILITY

The suspension type-screen device according to an embodiment of the present invention has advantages upon an use of a large size screen. In particular, the suspension type-screen device according to an embodiment of the present invention has significant advantages in a condition that a longitudinal dimension of a roll on which the large size screen is wound is relatively larger (e.g., 1500 mm to 3000 mm) whereas its lateral dimension is relatively smaller (e.g., 45 mm to 55 mm).

CROSS REFERENCE TO RELATED PATENT APPLICATION

The present application claims the right of priority of Japan patent application No. 2018-024266 (filing date: Feb. 14, 2018, title of the invention: SUSPENSION TYPE-SCREEN DEVICE), the whole contents of which are incorporated herein by reference.

BRIEF EXPLANATION OF REFERENCE NUMERALS 10, 10' Casing
20' Roll
20A Main roll
20B, $20B_1$, $20B_2$ Sub roll
30, 30' Large size screen
31' V-shaped wrinkle
32' Image
33' Distortion of Image
40 Insertion part
50 Adjustment part for position adjustment
51 Screw part
60 Attachment part
70 Plate part
80 Part to be pressed
81 Coupling part
90 Portion where pull-out is started (i.e., Start portion of pull-out
100, 100' Suspension type-screen device
S Gap

The invention claimed is:

1. A suspension type-screen device comprising:
a main roll rotatably supported on a casing; and
a screen configured to be pulled back around the main roll upon a storing thereof and to be pulled out downwardly from the main roll upon an use thereof, and
wherein the device further comprises a sub roll, and the sub roll is configured to be capable of supporting the screen located at a portion where a pull-out from the main roll is started.

2. The suspension type-screen device according to claim 1, wherein the sub roll is located adjacent to the main roll as of a start of the pull-out of the screen.

3. The suspension type-screen device according to claim 1, wherein the sub roll is rotatably supported on the casing and a longitudinal axis between both ends of the sub roll is configured to be capable of being curved upwardly.

4. The suspension type-screen device according to claim 3, wherein the longitudinal axis between both ends of the upwardly curved sub roll is configured to be movable downwardly.

5. The suspension type-screen device according to claim 1, further comprising an insertion part insertable from a lower side of the sub roll into an inside thereof and a part to be pressed provided in the sub roll, and
wherein the insertion part is configured to be upwardly moved to be capable of pressing the part to be pressed in the sub roll.

6. The suspension type-screen device according to claim 5, wherein at least two sub rolls have a single line arrangement to form a predetermined gap, each sub roll is coupled with each other via a coupling part, and the coupling part is used as the part to be pressed.

7. The suspension type-screen device according to claim 5, further comprising an adjustment part serving to adjust a position of the insertion part, and wherein a position of the adjustment part is configured to be changeable.

* * * * *